(12) United States Patent
Janson et al.

(10) Patent No.: US 8,939,862 B2
(45) Date of Patent: Jan. 27, 2015

(54) FINAL DRIVE MECHANISM AND POWER TAKE OFF FOR A TRANSMISSION

(75) Inventors: David A. Janson, Plymouth, MI (US); Jeffrey E. Maurer, Commerce, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 438 days.

(21) Appl. No.: 13/552,717

(22) Filed: Jul. 19, 2012

(65) Prior Publication Data

US 2012/0279327 A1   Nov. 8, 2012

Related U.S. Application Data

(63) Continuation-in-part of application No. 13/052,376, filed on Mar. 21, 2011, now Pat. No. 8,403,798.

(51) Int. Cl.
| | |
|---|---|
| *F16H 48/06* | (2006.01) |
| *F16H 57/021* | (2012.01) |
| *F16H 48/08* | (2006.01) |
| F16H 3/66 | (2006.01) |
| F16H 47/08 | (2006.01) |
| F16H 45/02 | (2006.01) |

(52) U.S. Cl.
CPC ............. *F16H 57/021* (2013.01); *F16H 48/08* (2013.01); *F16H 3/66* (2013.01); *F16H 47/08* (2013.01); *F16H 2045/0215* (2013.01); *F16H 2200/201* (2013.01); *F16H 2200/2046* (2013.01)
USPC ........................................................ 475/221

(58) Field of Classification Search
None
See application file for complete search history.

(56) References Cited

U.S. PATENT DOCUMENTS

| | | | | |
|---|---|---|---|---|
| 4,412,459 | A * | 11/1983 | Goscenski, Jr. ................. | 475/86 |
| 5,533,943 | A * | 7/1996 | Ichioka et al. ................ | 475/198 |
| 5,643,127 | A * | 7/1997 | Yoshii et al. ................... | 475/160 |
| 6,074,321 | A * | 6/2000 | Maeda et al. .................. | 475/221 |
| 6,540,636 | B2 * | 4/2003 | Amanuma et al. ............. | 475/149 |
| 6,719,654 | B2 * | 4/2004 | Deichl et al. ...................... | 475/5 |
| 7,351,178 | B2 * | 4/2008 | Keuth ........................... | 475/204 |
| 7,549,940 | B2 * | 6/2009 | Kira et al. ...................... | 475/204 |
| 7,988,583 | B2 * | 8/2011 | Hirase ........................... | 475/225 |
| 8,007,391 | B2 * | 8/2011 | Kikura et al. ................. | 475/225 |
| 8,152,678 | B2 * | 4/2012 | Fujii et al. ..................... | 475/221 |
| 8,403,788 | B2 * | 3/2013 | Janson et al. ................... | 475/59 |
| 8,403,798 | B2 * | 3/2013 | Janson et al. ................. | 475/221 |
| 8,480,522 | B2 * | 7/2013 | Akutsu et al. ..................... | 475/5 |
| 8,701,523 | B2 * | 4/2014 | Zerbato et al. .................. | 74/661 |
| 8,888,636 | B2 * | 11/2014 | Ikegami et al. .................... | 475/5 |
| 2006/0068963 | A1 * | 3/2006 | Sugano et al. ................ | 475/206 |

* cited by examiner

*Primary Examiner* — Dirk Wright
(74) *Attorney, Agent, or Firm* — James Dottavio; MacMillan, Sobanski & Todd, LLC

(57) ABSTRACT

A drive mechanism includes a transmission including a pinion centered at an axis, a differential mechanism centered at a second axis forward of the axis, driveably connected to the pinion through a gear wheel meshing with the pinion, and a power take-off mechanism centered at a third axis rearward of the axis, driveably connected to the pinion, including a clutch that alternately opens and closes a drive connection to the pinion.

18 Claims, 10 Drawing Sheets

FINAL DRIVE MECHANISM AND POWER TAKE OFF FOR A TRANSMISSION

This application is a continuation-in-part of pending U.S. application Ser. No. 13/052,376, filed Mar. 21, 2011.

BACKGROUND OF THE INVENTION

1. Field of the Invention

This invention relates to an automatic transmission for a motor vehicle that includes planetary gearsets and clutches and brakes whose state of engagement and disengagement determines speed ratios produced by the transmission.

2. Description of the Prior Art

In a front wheel drive vehicle, the axial space available for the transmission is limited by the width of the engine compartment and the length of the engine. In addition, the trend to increase the number of ratios available generally increases the number of components required. For these reasons, it is desirable to position components concentrically in order to minimize axial length. The ability to position components concentrically is limited, however, by the need to connect particular components mutually and to the transmission case.

Furthermore, it is desirable for the output element to be located near the center of the vehicle, which corresponds to the input end of the gear box. An output element located toward the outside of the vehicle may require additional support structure and add length on the transfer axis. With some kinematic arrangements, however, the need to connect certain elements to the transmission case requires that the output element be so located.

Chain drive transaxle final drive systems with grounded ring planetary gear sets have unacceptable noise, vibration and harshness properties due to chain lash. Transfer shaft gearing systems limit overall gear ratio.

SUMMARY OF THE INVENTION

A drive mechanism includes a transmission including a pinion centered at an axis, a differential mechanism centered at a second axis forward of the axis, driveably connected to the pinion through a gear wheel meshing with the pinion, and a power take-off mechanism centered at a third axis rearward of the axis, driveably connected to the pinion, including a clutch that alternately opens and closes a drive connection to the pinion.

The drive mechanism satisfies a vehicle styling requirement that locates the front wheel axles, with respect to the lateral axis of the vehicle, forward of the engine and provides all-wheel drive (AWD) operation. The power-take off (PTU) is integrated into the front wheel drive transaxle.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
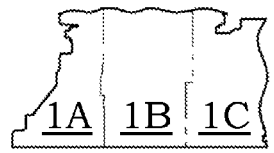
FIG. 1 is a cross sectional side view of a multiple speed automatic transaxle.

Referring now to the drawings, FIG. 1 illustrates gearing, clutches, brakes, shafts, fluid passages, and other components of a multiple-speed automatic transaxle 10 arranged substantially concentrically about an axis 11.

A torque converter includes an impeller driven by an engine, a turbine hydrokinetically coupled to the impeller, and a stator between the impeller and turbine. A transmission input shaft 20 is secured by a spline connection 21 to the turbine. The stator is secured by a spline connection 22 to a front support 24, which is secured against rotation to a transmission case 26.

A double pinion, speed reduction planetary gearset 28 includes a sun gear 30, secured by a spline connection 31 to input shaft 20; a carrier 32, secured by a spline connection 33 to the front support 24; a ring gear 34, secured by a spline connection 35 to a front cylinder assembly 36; a first set of planet pinions 38 supported on carrier 32 and meshing with sun gear 30; and a second set of planet pinions 40, supported on carrier 32 and meshing with ring gear 34 and the first pinions 38. Ring gear 34 rotates in the same direction as input shaft 20 but at a reduced speed.

Rear gearset 46 and middle gearset 48 are simple planetary gearsets. Gearset 46 includes a set of planet pinion 50 supported for rotation on carrier 52 and meshing with both sun gear 54 and ring gear 56. Gearset 48 includes a set of planet pinions 58 supported for rotation on carrier 60 and meshing with both sun gear 62 and ring gear 64. Sun gear 54 is splined to a shaft that is splined to a shell 66, on which shaft sun gear 62 is formed, thereby securing the sun gears 54, 62 mutually and to the shell 66. Carrier 52 is fixed to a shell 68. Carrier 60 and ring gear 56 are fixed to each other and to output pinion 70 through a shell 72. Ring gear 64 is fixed to shell 74.

Front cylinder assembly 36, which is fixed to ring gear 34, actuates clutches 76, 80. Plates for clutch 76 includes plates splined to front cylinder assembly 36 alternating with plates splined to shell 74. When hydraulic pressure is applied to piston 78, the plates are forced together and torque is transmitted between ring gears 34 and 64. When the hydraulic pressure is released, ring gears 34 and 64 may rotate at different speeds with low parasitic drag. Similarly, plates for clutch 80 include plates splined to front cylinder assembly 36 alternating with plates splined to shell 66. When hydraulic pressure is applied to piston 82, torque is transmitted between ring gear 34 and sun gears 54, 62. Pressurized fluid is routed from a control body 84, through front support 24, into front cylinder assembly 36 between rotating seals.

Middle cylinder assembly 86, which includes carrier 32, actuates brake 88. Plates for brake 88 include plates splined to carrier 32 alternating with plates splined to shell 66. When hydraulic pressure is applied to piston 90, the brake holds sun gears 54, 62 against rotation. Pressurized fluid is routed from the control body 84, through front support 24, between planet pinions 38, 40, into middle cylinder assembly 86. Due to the location of clutch pack 88, output element 70 is located in the more favorable position near the front of the gear box.

Rear cylinder assembly 92 is secured by a spline connection 93 fixed to input shaft 20. When hydraulic pressure is applied to piston 94, the plates of clutch 96 transmit torque between input shaft 20 and carrier 52. Similarly, when hydraulic pressure is applied to piston 98, the plates of clutch 100 transmit torque between input shaft 20 and sun gears 54, 62. Pressurized fluid is routed from the control body 84, into rear cylinder assembly 92.

When hydraulic pressure is applied to piston 102, brake 104 holds carrier 52 and shell 68 against rotation. A one-way brake 106 passively prevents carrier 52 and shell 68 from rotating in the negative direction, but allows them to rotate in the forward direction. One-way brake 106 may optionally be omitted and its function performed by actively controlling brake 104.

The D brake 104 is used only as a latching device not as a dynamic brake. To minimize parasitic viscous drag loss produced in brake 104 it is desired that excess oil not be present in the brake. Therefore, an oil dam formed by an oil seal 103 between the piston 94 of E clutch 96 and the inner race 107 of one-way brake 106 is provided to limit or prevent oil from entering the D brake 104. The inner radial end of return spring 108 continually contacts the piston 102 that actuates brake 104. The outer radial end of return spring 108 continually contacts a fixed structure, so that the spring flexes as the piston 102 moves in the cylinder of the D brake 104. In this way, return spring 108 also participates in the oil dam by limiting or preventing radial flow of oil into the D brake 104 caused by centrifugal force.

This arrangement permits brake 88 and clutches 76, 80 to be mutually concentric, located at an axial plane, and located radially outward from the planetary gearsets 28, 46, 48 such that they do not add to the axial length of the gearbox. Similarly, clutches 96, 100 and brake 104 are mutually concentric and located radially outward from the planetary gearing 28, 46, 48. Clutches 76, 80, 96, 100 and brakes 88, 104, 106 comprise the control elements.

Figure 2A:
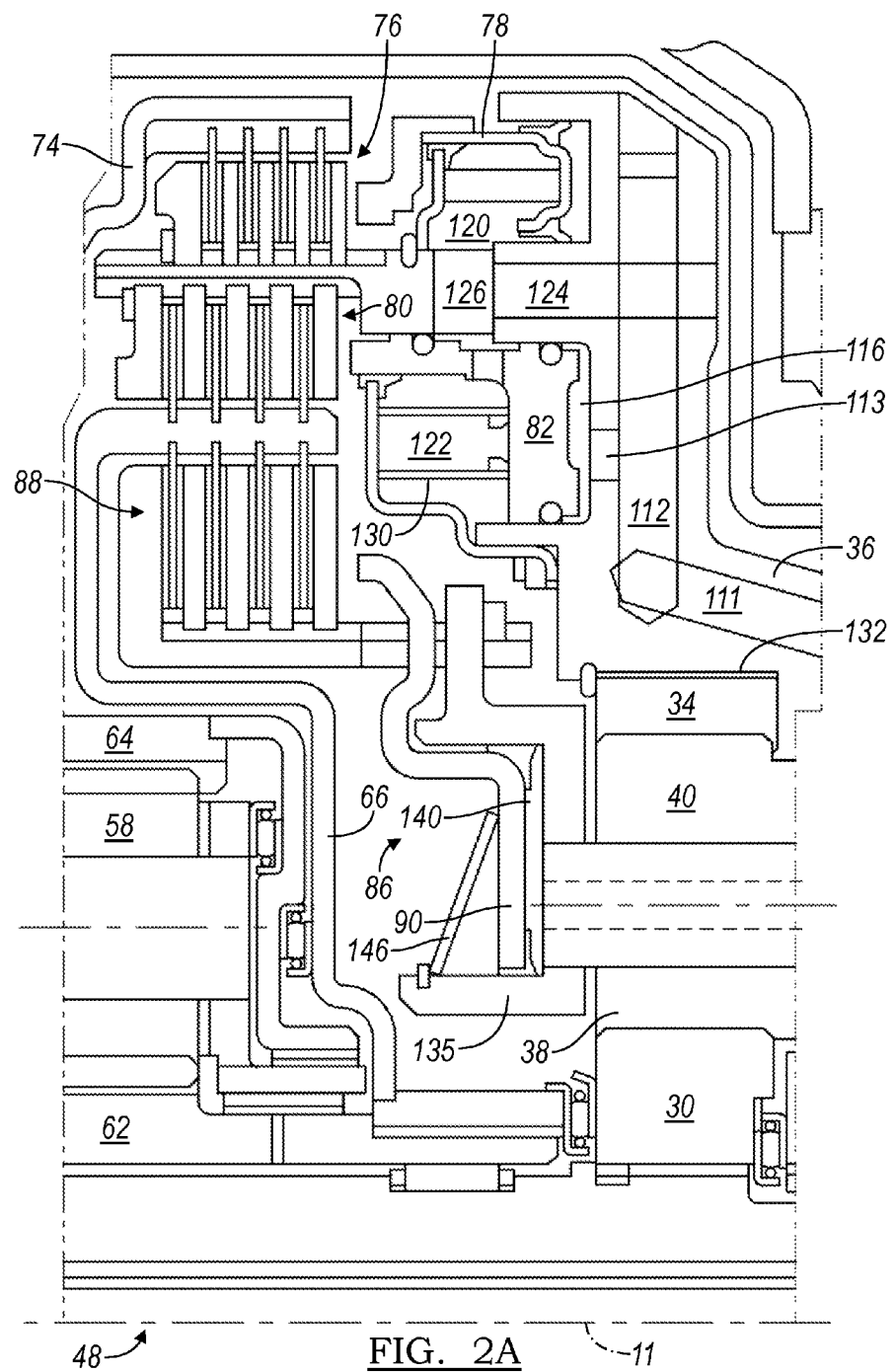
FIG. 2 is cross sectional side view of the transaxle showing the front and middle cylinder assemblies.
Figure 2B:
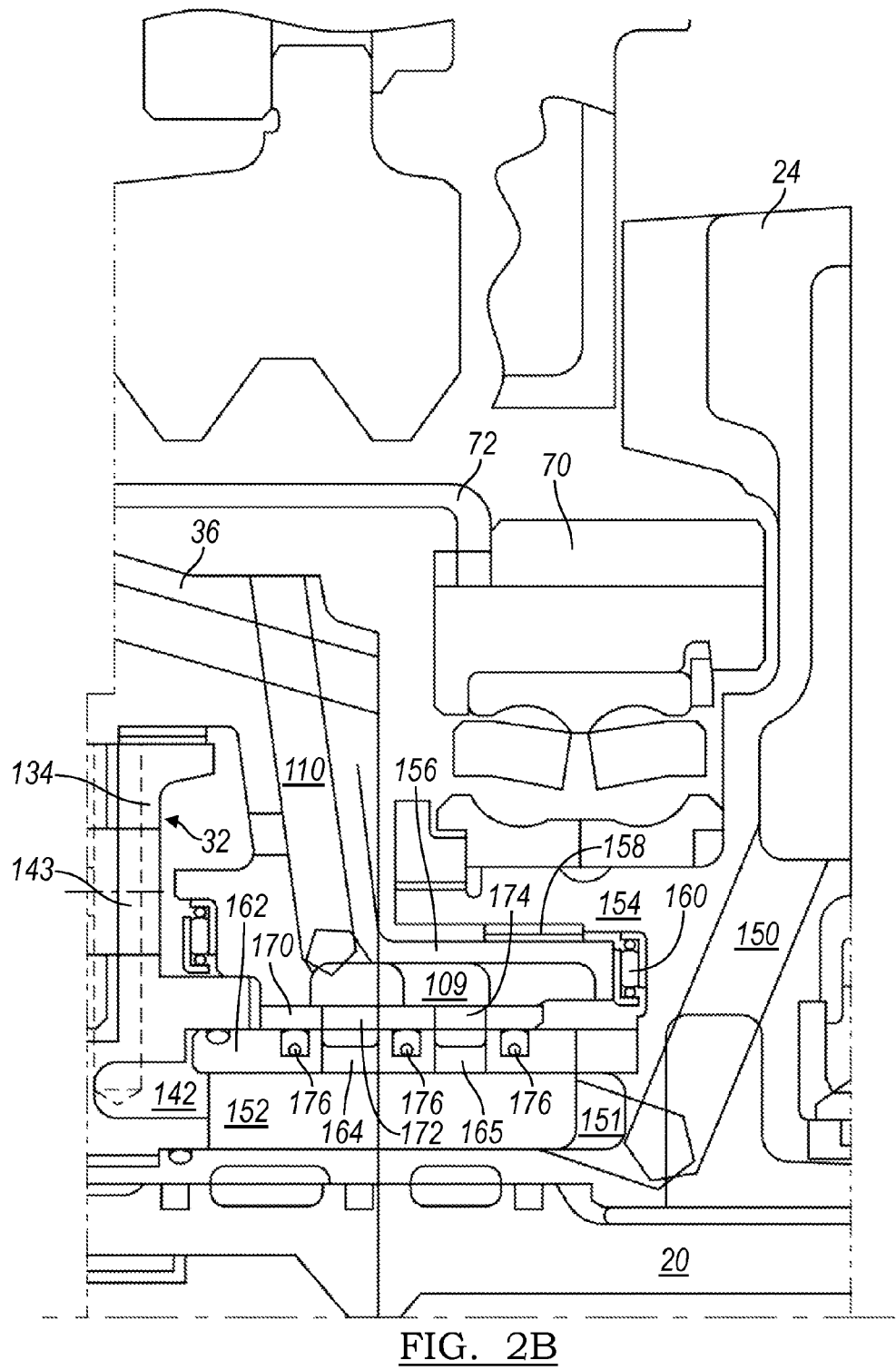

As FIGS. 2A, 2B illustrate, the front cylinder assembly 36 is supported for rotation on the fixed front support 24 and carrier 34. The front cylinder assembly 36 is formed with clutch actuation fluid passages, each passage communicating with one of the cylinders 114, 116 formed in the front cylinder assembly 36. Cylinder 114 contains piston 78; cylinder 116 contains piston 82. One of the fluid passages in front cylinder assembly 36 is represented in FIG. 2 by interconnected passage lengths 109, 110, 111, 112, through which cylinder 116 communicates with a source of clutch control hydraulic pressure. Another of the fluid passages in front cylinder assembly 36, which is similar to passage lengths 109, 110, 111, 112 but spaced angularly about axis 11 from passage lengths 109, 110, 111, 112, communicates a source of clutch control hydraulic pressure to cylinder 114. Passage lengths 109 are machined in the surface at the inside diameter of the front cylinder assembly 36.

The front cylinder assembly 36 is also formed with a balance volume supply passage, similar to, but spaced angularly about axis 11 from passage lengths 109, 110, 111, 112. The balance volume supply passage communicates with balance volumes 120, 122. As shown in FIG. 2A, the balance volume supply passage includes an axial passage length 124, which communicates with a source of balance volume supply fluid and pressure, and a radial passage length 126, through which fluid flows into the balance volumes 120, 122 from passage 124. Passage 124 may be a single drilled hole extending along a longitudinal axis and located between the two clutch balance areas of the A clutch and B clutch. Passage 124 carries fluid to cross drilled holes 126, which communicate with the balance volumes 120, 122.

Coiled compression springs 128, 130, each located in a respective balance dam 120, 122, urge the respective piston 78, 82 to the position shown in FIG. 2. Ring gear 34 is secured to front cylinder assembly 36 by a spline connection 132.

Middle cylinder assembly 86 includes carrier 32, which is grounded on the front support 24. Carrier 32 includes first and second plates 134, 135 and pinion shafts secured to the plates, one pinion shaft supporting pinions 38, and the other pinion shaft supporting pinions 40. Plate 135 is formed with a cylinder 140 containing a brake piston 90.

A source of brake actuating hydraulic pressure communicates with cylinder 140 through a series on interconnected passage lengths 142, 143 and a horizontal passage length that extends axially from passage 143, through a web of carrier 32, between the sets of planet pinions 38, 40, to cylinder 140. These brake feed passages are formed in carrier 32. When actuating pressure is applied to cylinder 140, piston 90 forces the plates of brake 88 into mutual frictional contact, thereby holding sun gears 54, 62 and shell 66 against rotation. A Belleville spring 146 returns piston 90 to the position shown in FIG. 2, when actuating pressure is vented from cylinder 140.

The front support 24 is formed with passages, preferably spaced mutually about axis 11. These passages in front support 24 are represented in the FIGS. 1 and 2 by passage lengths 150, 151, 152, through which hydraulic fluid is supplied to clutch servo cylinders 114, 116, brake servo cylinder 140, and balance dams 120, 122. A passage of each of the front support passages communicates hydraulic fluid and pressure to cylinders 114, 116 and balance dams 120, 122 of the front cylinder assembly 36 through the fluid passages 109, 110, 111, 112, 113, 124 formed in the front cylinder assembly 36. Another passage of each of the front support passages communicates hydraulic fluid and pressure to cylinder 140 of the middle cylinder assembly 86 through the fluid passages 142, 143 in carrier 32.

The front support 24 includes a bearing support shoulder 154, which extends axially and over an axial extension 156 of the front cylinder assembly 36. A bushing 158 and bearing 160 provide for rotation of the front cylinder assembly 36 relative to the front support 24. This arrangement of the front support 24, its bearing support shoulder 154, and front cylinder assembly 36, however, prevents radial access required to machine a passage or passages that would connect first passage 152 in front support 24 to the second passage 109 in the front cylinder assembly 36.

To overcome this problem and provide hydraulic continuity between passage lengths 109, 152, first passage 152 is formed with an opening that extends along a length of first passage 152, parallel to axis 11, and through an outer wall of the front support 24. The opening faces radially outward toward second passage 109. Similarly, second passage 109 is formed with a second opening that extends along a length of second passage 109, parallel to axis 11, and through an inner wall of the front cylinder assembly 36. The second opening faces radially inward toward first passage 152.

A first sleeve 162 is inserted axially with a press fit over a surface at an outer diameter of the front support 24, thereby covering the opening at the outer surface of passage length 152. Sleeve 162 is formed with radial passages 164, 165, which extend through the thickness of the sleeve 162. Seals 176, located at each side of the passages 164, 165 prevent leakage of fluid from the passages.

A second sleeve 170 is inserted axially with a press fit over the second opening at the inside diameter of the front cylinder assembly 36, thereby covering and enclosing the length of the second opening in the second passage 109. Sleeve 170 is formed with radial openings, two of which are represented in FIG. 2 by openings 172, 174, aligned with the radial passages 164, 165 formed in the first sleeve 162.

Sleeves 164 and 170 provides hydraulic continuity from the source of fluid pressure carried in the passages of the front support 24 to the balance dams 120, 122 and the servo cylinders 114, 116, 140, through which clutches 76, 80 and brake 88 are actuated.

Figure 3:
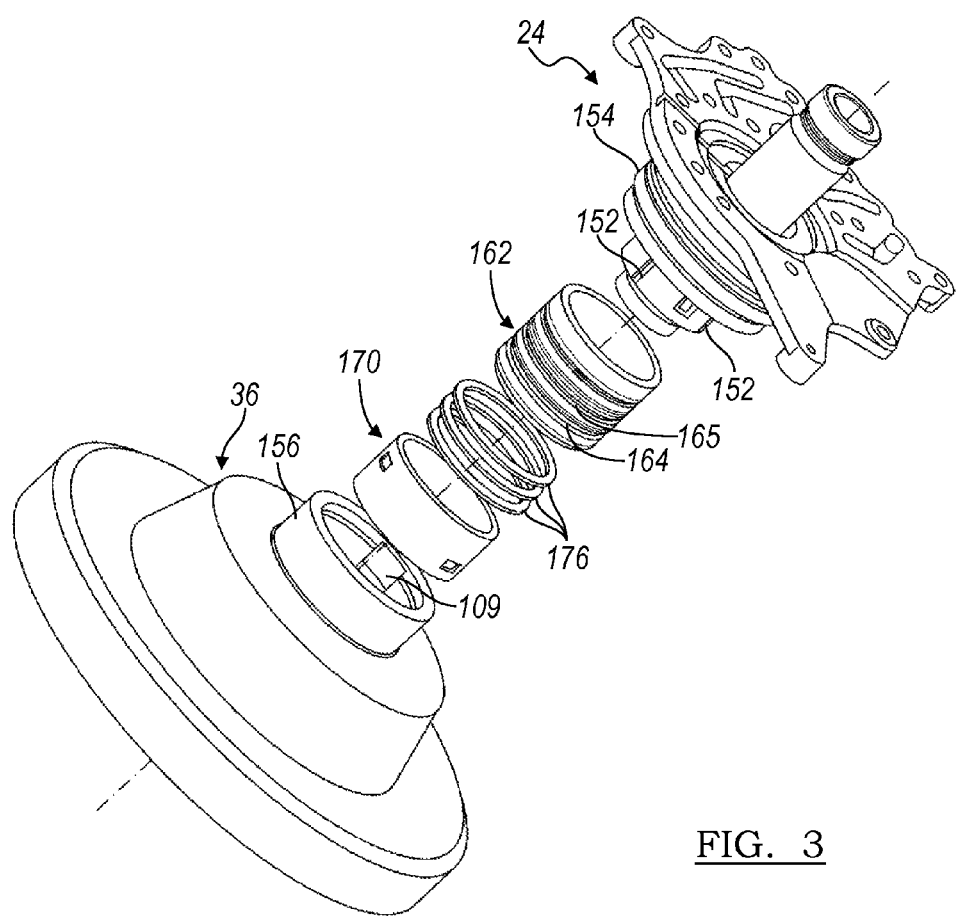
FIG. 3 is a side perspective view showing sleeves that are fitted on the front support and middle cylinder assembly, respectively.

Sleeves 162, 170 also provide access that enables machining of the first and second passages 152, 109 in the surface at the outside diameter of front support 24 and in the surface at the inside diameter of the front cylinder assembly 36. FIG. 3 shows sleeves 162, 170 and three seals 176, which are fitted in recesses on sleeve 162 between each of its radial passages 164, 165.

Figure 4:
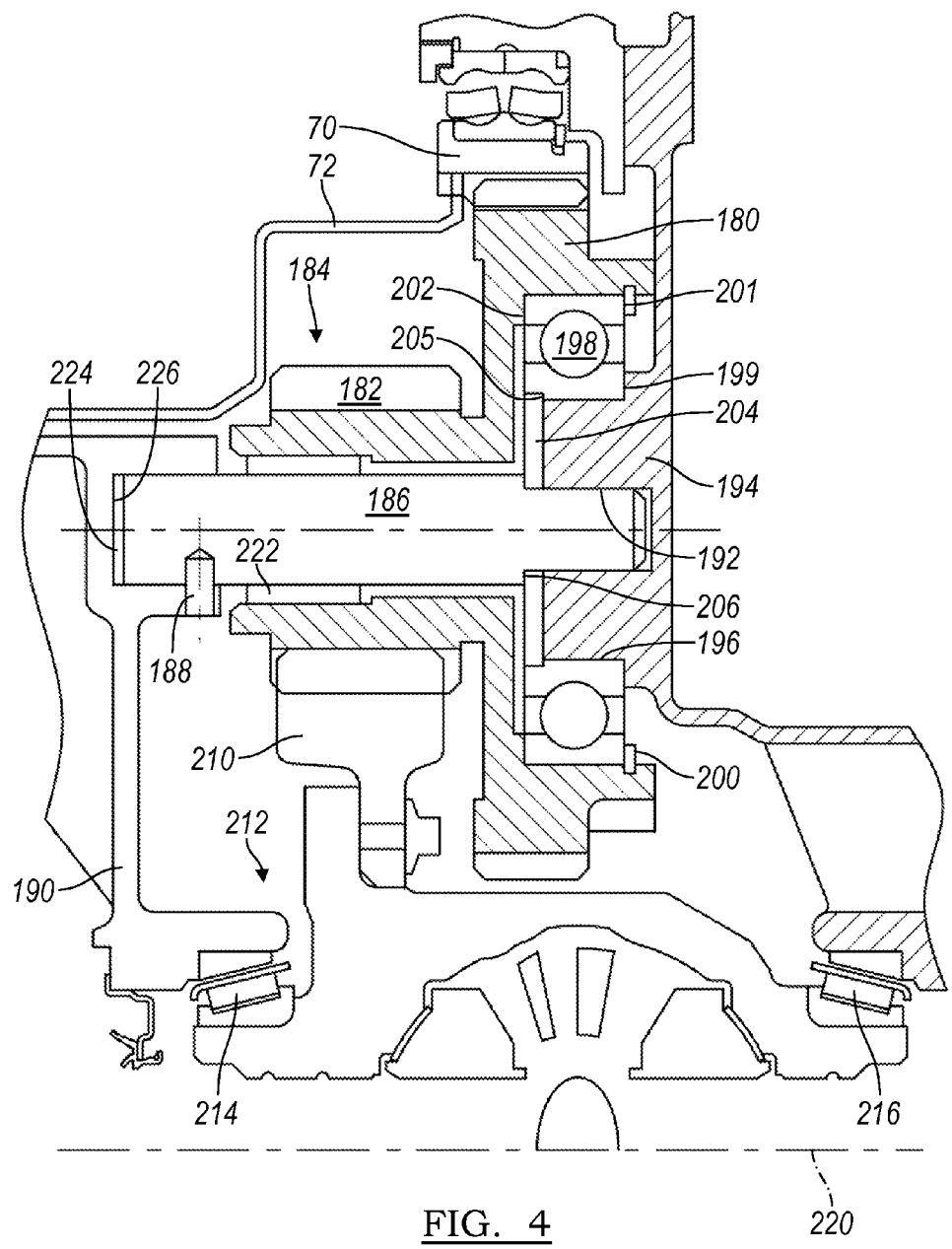
FIG. 4 is a view cross sectional side view of the transfer gears and shaft near the output of the transaxle.

As FIG. 4 shows output pinion 70 meshes with a transfer gear 180, which is formed integrally with transfer pinion 182 on a transfer wheel 184. A transfer shaft 186, is secured at one end by a pinned connection 188 to a non-rotating housing component 190, and at the opposite end is seated in a recess 192 formed in a non-rotating torque converter housing component 194. Ball bearing 198 supports transfer wheel 184 on the torque converter housing 194. Housing components 190, 194 comprise a reaction component and may be formed integrally or preferably as separate components.

Ball bearing 198 is supported radially by being seated on a surface 196 of the torque converter housing 194. A shoulder 199 on torque converter housing 194 contacts the right-hand axial surface of the inner race of bearing 198, the second surface of bearing 198. A snap ring 200 contacts the right-hand axial third surface 201 of the outer race of bearing 198. Shoulder 199 and snap ring 200 limit rightward axial movement of bearing 198.

A shoulder 202 formed on gear wheel 184 contacts the left-hand axial first surface of the outer race of bearing 198. A thrust washer 204 contacts a left-hand axial fourth surface 205 of the inner race of bearing 198. The thrust washer 204 contacts a shoulder 206 formed on transfer shaft 186. Shoulders 202 and 206 limit leftward axial movement of bearing 198

The ring gear 210 of a differential mechanism 212 meshes with transfer pinion 182 and is supported for rotation by bearings 214, 216 on housing 190, 194.

Rotating power transmitted to output pinion 70 is transmitted through transfer gears 180, 182 and ring gear 210 to the input of differential, which drives a set of vehicle wheels aligned with axis 220.

A roller bearing 222 supports transfer wheel 184 on transfer shaft 186. The thickness of a washer 224, fitted in a recess 226 of housing 190, is selected to ensure contact between thrust washer 204 and the inner race of bearing 198.

The output pinion 70 and transfer gears 180, 182 have helical gear teeth, which produce thrust force components in the axial direction parallel to axis 220 and in the radial direction, normal to the plane of FIG. 4. A thrust force in the right-hand direction transmitted to the transfer gear wheel 184 is reacted by the torque converter housing 194 due to its contact at shoulder 199 with bearing 198. A thrust force in the left-hand direction transmitted to the transfer gear wheel 184 is reacted by the housing 190 due to contact between snap ring 200 and bearing 198, contact between bearing 198 and thrust washer 204, contact between the thrust washer and transfer shaft 186, and contact between shaft 186, washer 224 and housing 190.

Figure 1A:
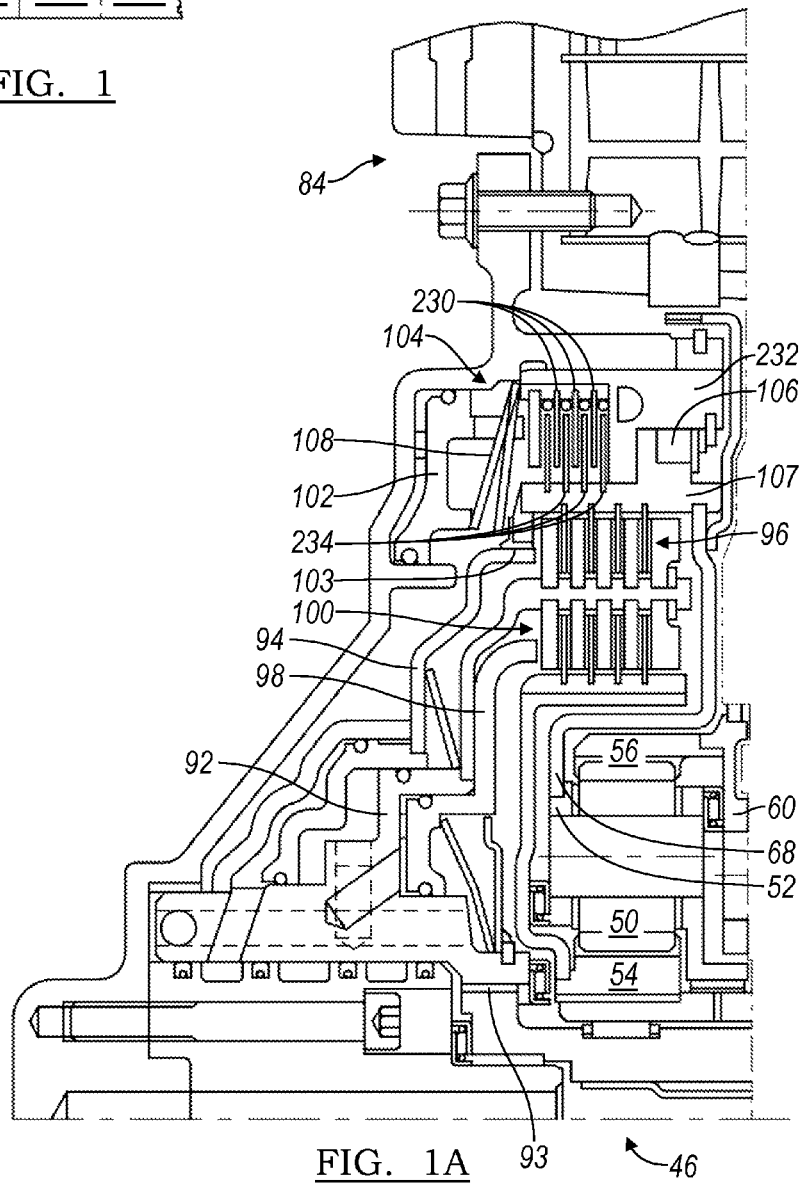
Figure 1B:
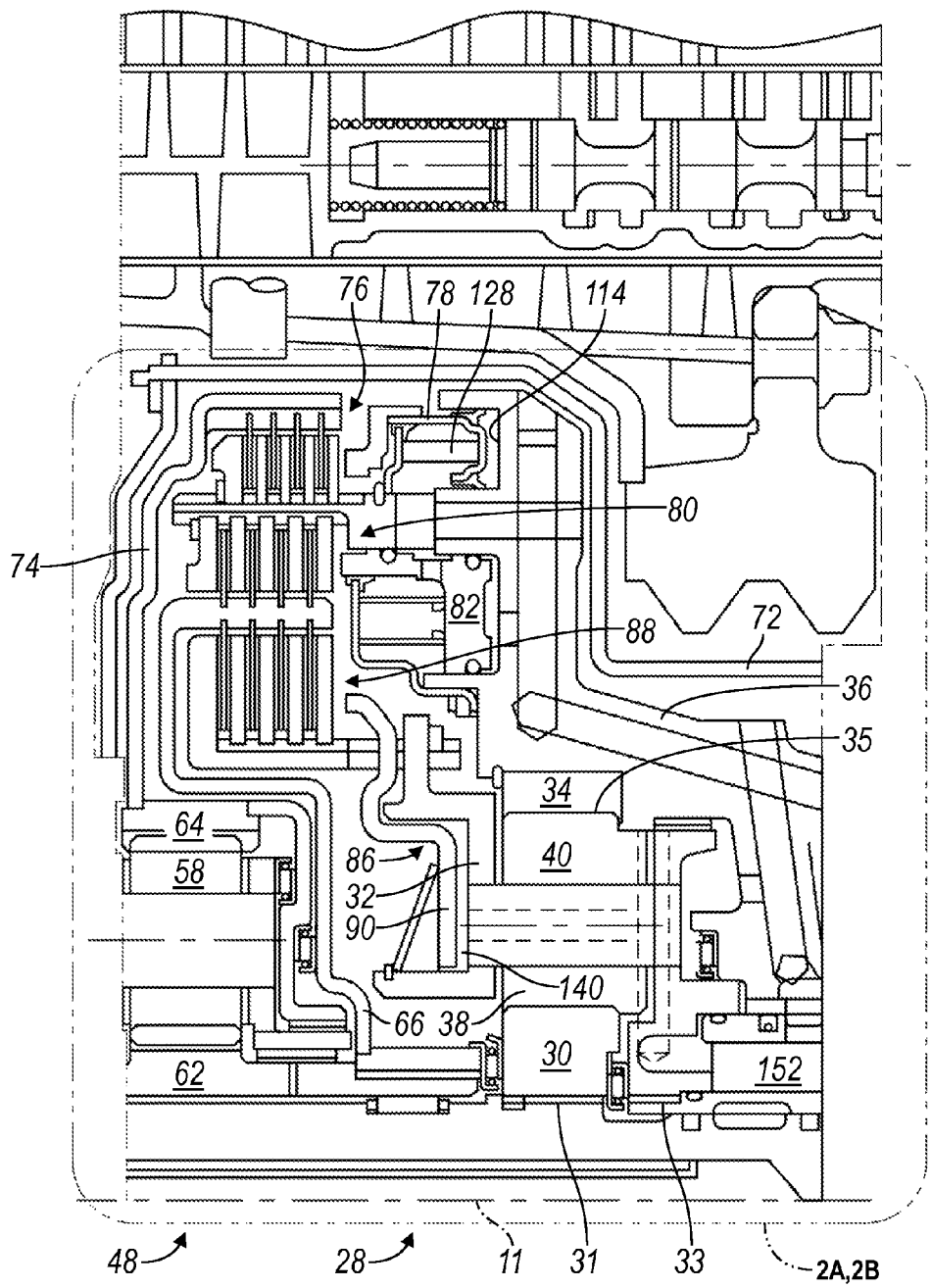
Figure 1C:
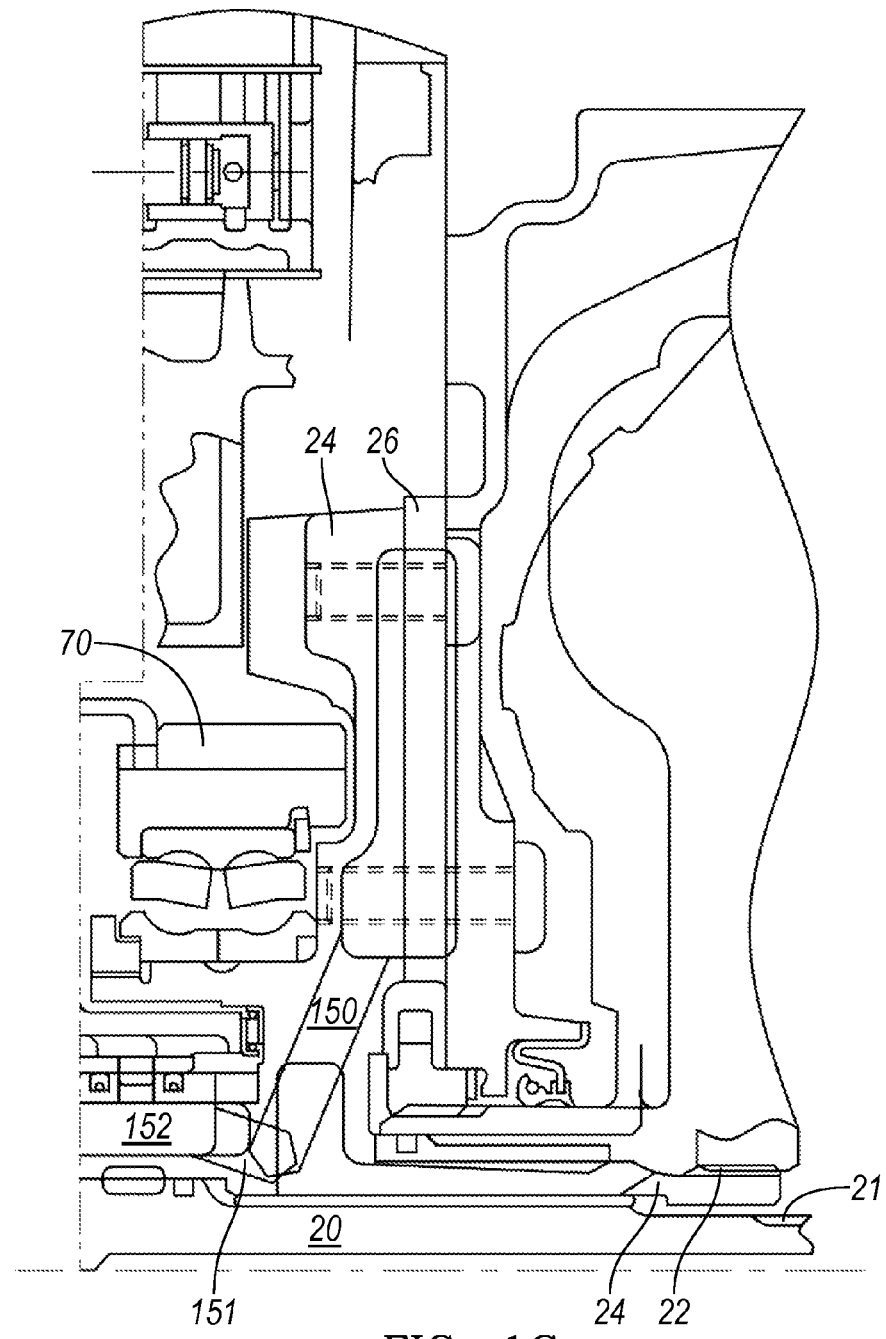

As shown in FIG. 1A, the D brake 104 includes a first set of thin discs 230 secured to the outer race 232 of one-way brake 106 by a spline connection, which permits the discs 230 to move axially and prevents them from rotating relative to the race 232, which is fixed to the transmission case or end cover against rotation.

Similarly, the D brake 104 includes a second set of thin discs 234 secured to the inner race 107 of one-way brake 106 by a spline connection, which permits the discs 234 to move axially and prevents them from rotating relative to the inner race 107. Inner race 107 is fixed to the carrier 68 of gearset 46, such that they rotate together as a unit at the same speed. Preferably the outer and inner races 232, 107 of one-way brake 106 are formed of a ferrous alloy of sintered powdered metal, and discs 230, 234 are of steel. Preferably the one-way brake 106 is a rocker one-way brake of the type having a pivoting rockers, each rocker retained is a pocket and actuated by centrifugal force and a compression spring, as described in U.S. Pat. Nos. 7,448,481 and 7,451,862.

The reaction spline for the D clutch 104 is preferably not formed in the aluminum case or end cover because of high local stresses caused by the thin discs 232, 234 used to reduce parasitic loss. The D clutch reaction splines are formed as an integral part of the raceways of the one-way brake 106. The brake 106 is then splined to the transmission case.

Figure 5:
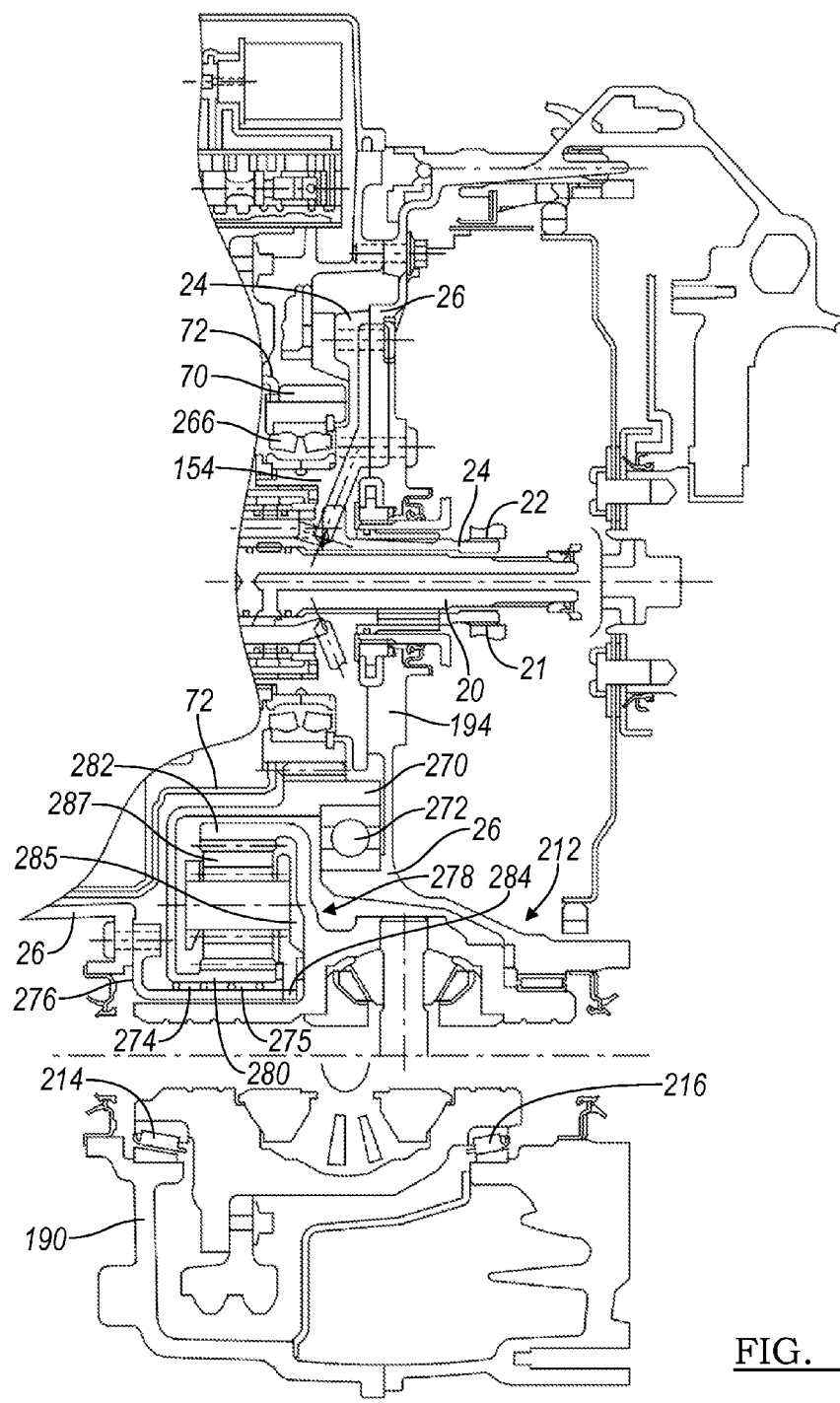
FIG. 5 is a cross sectional side view of a multiple speed automatic transaxle having an alternate final drive mechanism from that of FIG. 4.

The final drive mechanism of FIG. 5 produces a drive connection between the output pinion 70 and the input of the differential mechanism 212. Output pinion 70 meshes with output gear 270, which is supported on a ball bearing 272 and roller bearings 274, 275. Bearing 272 is supported on the transmission case 26; bearings 274, 275 are supported on an extension 276, which is bolted to the case.

A planetary final drive gearset 278 includes a sun gear 280, secured to the output gear 270; a ring gear 282, secured to the input of differential 212; a carrier 285, fixed against rotation by a spline connection 284 to the cover extension 276; and planet pinions 287 supported on the carrier 285 and meshing with the sun gear 280 and ring gear 282. The final drive gearset 278 drives the differential input at a speed that is reduced relative to the speed of output gear 270 and reverses the direction of rotation relative to the direction of rotation of output gear 270. The differential drives the axle shafts, which are secured to the driven wheels.

The final drive mechanism of FIG. 5 produces a drive connection between the output pinion 70 and the input of the differential mechanism 212. Output pinion 70 meshes with output gear 270, which is supported on a ball bearing 272 and roller bearings 274, 275. Bearing 272 is supported on the transmission case 26; bearings 274, 275 are supported on an extension 276, which is bolted to the case.

A planetary final drive gearset 278 includes a sun gear 280, secured to the output gear 270; a ring gear 282, secured to the input of differential 212; a carrier 285, fixed against rotation by a spline connection 284 to the cover extension 276; and planet pinions 287 supported on the carrier 285 and meshing with the sun gear 280 and ring gear 282. The final drive gearset 278 drives the differential input at a speed that is reduced relative to the speed of output gear 270 and reverses the direction of rotation relative to the direction of rotation of output gear 270. The differential drives the axle shafts, which are secured to the driven wheels.

Figure 6:
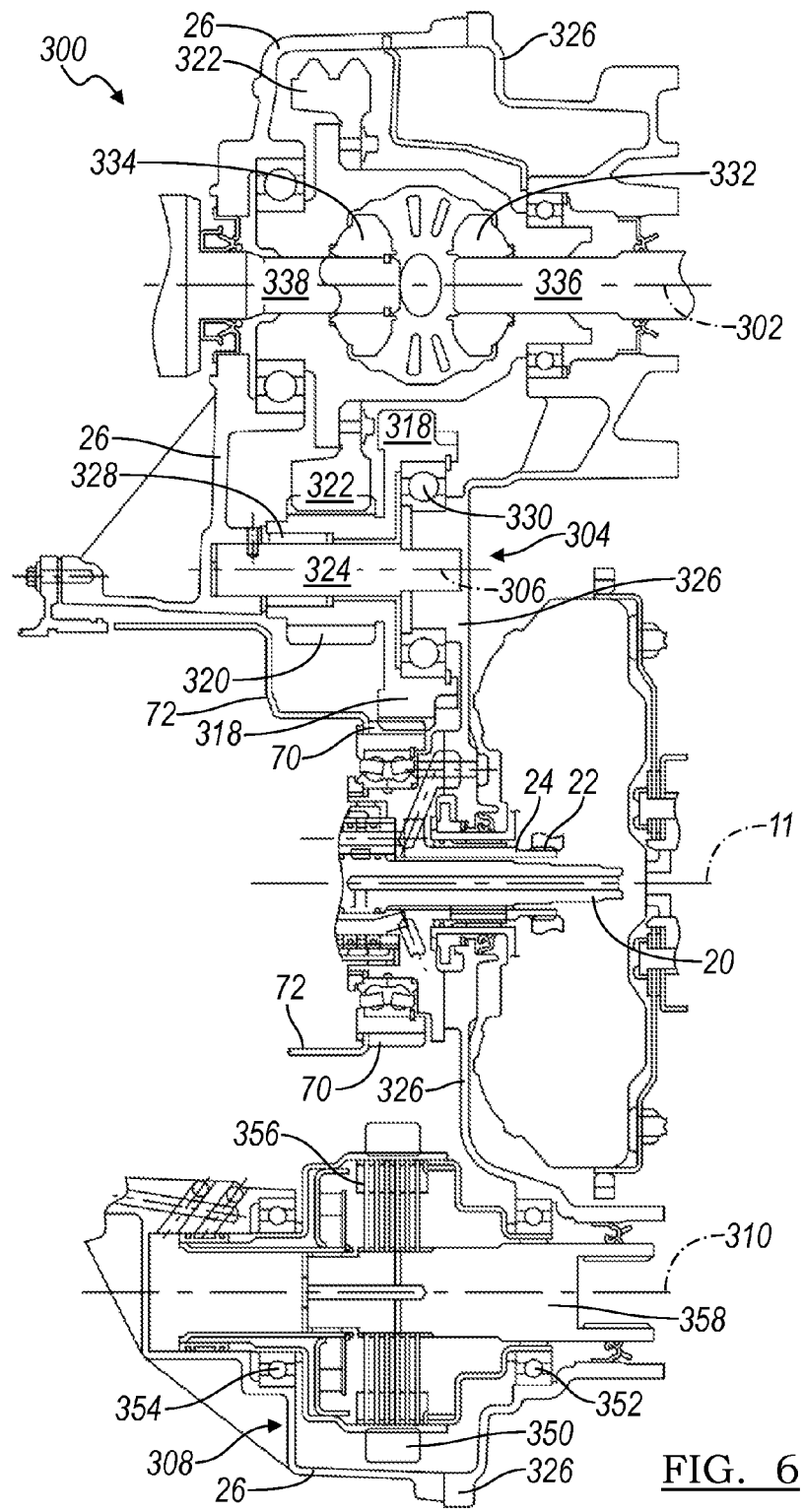
FIG. 6 is a cross sectional side view of a multiple speed automatic transaxle showing a power take-off mechanism and an alternate final drive.
Figure 7:
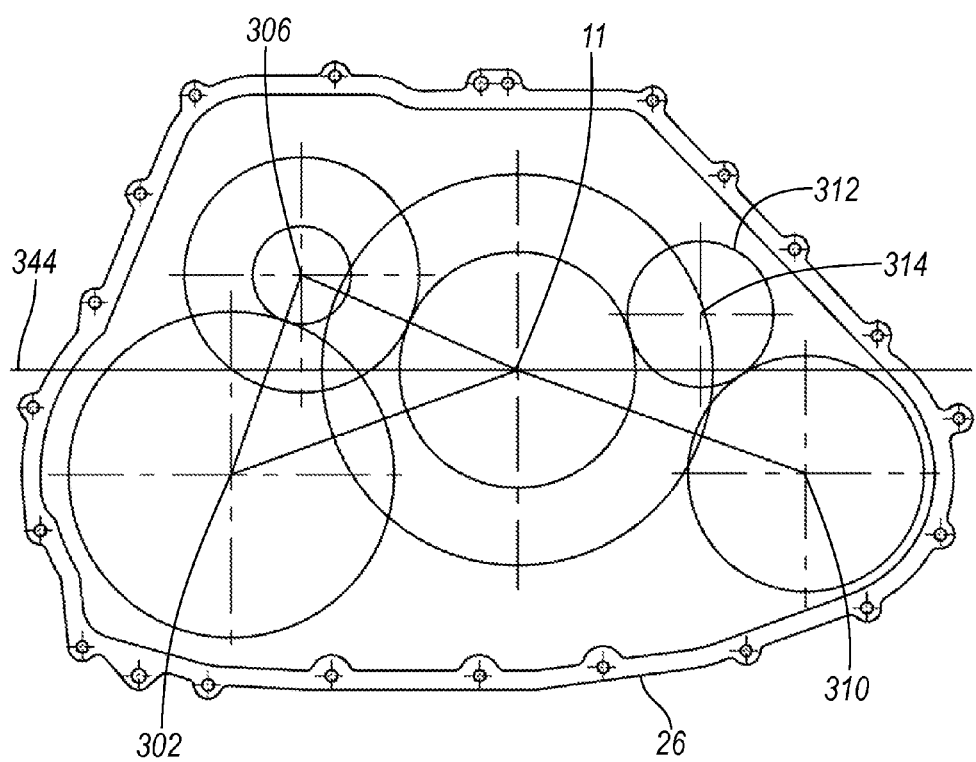
FIG. 7 is a schematic diagram showing the arrangement of the principal axes of the transmission, power take-off mechanism and final drive of FIG. 6.

The drive mechanism shown in FIGS. 6 and 7 produces a drive connection between output pinion 70 and the input of a differential mechanism 300, centered on axis 302, through a final drive 304, centered on axis 306. The drive mechanism also produces a drive connection between output pinion 70 and a power-take-off (PTU) mechanism 308, centered on axis 310, through a gear 312, centered on axis 314.

The final drive gear wheel 304 includes a gear 318, which meshes with output pinion 70, and a pinion 320, which is formed integrally with gear 318 and meshes with the ring gear 322 of differential mechanism 300. A shaft 324, journalled on front support 326 and transmission housing 26, supports the gear wheel 304. A roller bearing 328 and ball bearing 330 support gear wheel 304 on shaft 324 and front support 326, respectively. The side bevel gears 332, 334 of differential mechanism 300 are connected by splines to halfshafts 336, 338, which transmits rotating power to the front vehicle wheels. Bearings 340, 342 at least partially support the halfshafts on front support 326 and housing 26, respectively.

FIG. 7 illustrates the vehicle's longitudinal axis 344, and shows that the axis of the front wheels is located with respect to the vehicle's lateral axis, forward of the axis 11, on which the engine's crankshaft and the transmission input shaft 20 are centered.

Output pinion 70 also meshes with gear 318, which meshes with a PTU gear 350, supported by bearings 352, 354 on front support 326 and transmission housing 26, respectively. When all-wheel drive operation is desired, a clutch 356 is closed producing a drive connection between output pinion 70 and shaft 358 of power-take-off (PTU) mechanism 308, which transmits power to the rear wheels of the vehicle. All-wheel drive operation is terminated when clutch 356 is open.

FIG. 7 illustrates that the axis 310 of the power-take-off (PTU) mechanism 308 is located along the vehicle's longitudinal axis 344, rearward of the axis 11 of the engine crankshaft and transmission input shaft 20.

In accordance with the provisions of the patent statutes, the preferred embodiment has been described. However, it should be noted that the alternate embodiments can be practiced otherwise than as specifically illustrated and described.

The invention claimed is:

1. A drive mechanism, comprising:
 a transmission including a pinion centered at an axis;
 a differential mechanism centered at a second axis forward of the axis, driveably connected to the pinion through a gear wheel meshing with the pinion;
 a power take-off mechanism centered at a third axis rearward of the axis, driveably connected to the pinion, including a clutch that alternately opens and closes a drive connection to the pinion.

2. The drive mechanism of claim 1, wherein the gear wheel includes:
 a gear meshing with the pinion; and
 a second pinion secured to the gear and meshing with the differential mechanism.

3. The drive mechanism of claim 2, wherein the second pinion is formed integrally with the gear.

4. The drive mechanism of claim 1, further comprising:
 an input shaft of the transmission, wherein the axis is concentric with said input shaft.

5. The drive mechanism of claim 1, further comprising:
 a transmission housing;
 a front support secured to the transmission housing;
 a shaft journalled on the transmission housing and the front support;
 a first bearing seated in the front support and supporting the gear wheel for rotation relative to the shaft; and
 a second bearing seated on the shaft, spaced from the first bearing, and supporting the gear wheel for rotation relative to the shaft.

6. The drive mechanism of claim 1, further comprising:
 a transmission housing;
 a front support secured to the transmission housing;
 a shaft journalled on the transmission housing and the front support;
 a first bearing supporting the gear wheel for rotation relative to the shaft; and
 a second bearing spaced from the first bearing and supporting the gear wheel for rotation relative to the shaft.

7. A drive mechanism, comprising:
 a housing;
 a support secured to the housing;
 a transmission within the housing and the support, including a pinion centered at a axis;
 a differential mechanism within the housing and support centered at a second axis forward of the axis, driveably connected to the pinion through a gear wheel meshing with the pinion;
 a power take-off mechanism within the housing and support centered at a third axis rearward of the axis, driveably connected to the pinion, including a clutch that alternately opens and closes a drive connection to the pinion.

8. The drive mechanism of claim 7, further comprising:
 a shaft journalled on the housing and the support;
 a first bearing seated in the support and supporting the gear wheel for rotation relative to the shaft; and
 a second bearing seated on the shaft, spaced from the first bearing, and supporting the gear wheel for rotation relative to the shaft.

9. The drive mechanism of claim 7, further comprising:
 a shaft journalled on the housing and the support;
 a first bearing supporting the gear wheel for rotation relative to the shaft; and
 a second bearing spaced from the first bearing and supporting the gear wheel for rotation relative to the shaft.

10. The drive mechanism of claim 7 wherein the gear wheel includes a gear meshing with the pinion; and further comprising a second pinion secured to the gear and meshing with the differential mechanism.

11. The drive mechanism of claim 10, wherein the second pinion is formed integrally with the gear.

12. The drive mechanism of claim 7, wherein the transmission further includes an input shaft and the axis is concentric with the input shaft.

13. A drive mechanism, comprising:
 a transmission including a gearset producing speed ratios at an output, a pinion centered at a axis, and a shell connecting the output to the pinion;
 a differential mechanism centered at a second axis forward of the axis, driveably connected to the pinion through a gear wheel meshing with the pinion;
 a power take-off mechanism centered at a third axis rearward of the axis, driveably connected to the pinion, including a clutch that alternately opens and closes a drive connection to the pinion.

14. The drive mechanism of claim 13, further comprising:
 a transmission housing;
 a front support secured to the transmission housing;
 a shaft journalled on the housing and the support;
 a first bearing supporting the gear wheel for rotation relative to the shaft; and a second bearing spaced from the first bearing and supporting the gear wheel for rotation relative to the shaft.

16. The drive mechanism of claim 13, further comprising:
a transmission housing;
a front support secured to the transmission housing;
a shaft journalled on the housing and the support;
a first bearing seated in the support and supporting the gear wheel for rotation relative to the shaft; and
a second bearing seated on the shaft, spaced from the first bearing, and supporting the gear wheel for rotation relative to the shaft.

16. The drive mechanism of claim 13, wherein the gear wheel includes:
a gear meshing with the pinion; and
a second pinion secured to the gear and meshing with the differential mechanism.

17. The drive mechanism of claim 16, wherein the second pinion is formed integrally with the gear.

18. The drive mechanism of claim 13, wherein the transmission further includes an input shaft and the axis is concentric with the input shaft.

* * * * *